United States Patent [19]

Towle

[11] 4,221,417

[45] Sep. 9, 1980

[54] LINE RELEASE SYSTEM

[76] Inventor: John H. Towle, 41 Brookside Dr., Apartment D, Lansdale, Pa. 19446

[21] Appl. No.: 715,735

[22] Filed: Aug. 19, 1976

[51] Int. Cl.³ .............................................. B64D 17/38
[52] U.S. Cl. ................................................. 294/83 A
[58] Field of Search .......... 294/83 A, 83 AA, 83 AB, 294/83 AE; 244/150, 151 R, 152, 151 A, 152 A, 147, 138; 9/43; 24/73 PH; 403/320; 89/1.5 J

[56] References Cited

U.S. PATENT DOCUMENTS

| | | | |
|---|---|---|---|
| 2,949,330 | 8/1960 | Masser | 294/83 R |
| 2,955,867 | 10/1960 | Linthicum | 294/83 A |
| 3,624,813 | 11/1971 | Gaylord | 294/83 A |
| 3,642,236 | 2/1972 | Stanley | 244/147 |

*Primary Examiner*—James B. Marbert
*Attorney, Agent, or Firm*—R. S. Sciascia; Henry Hansen

[57] ABSTRACT

A line release system comprising a release actuator and latch which are interposed between a line and a parachute harness and which transmit the forces on the line to the harness until the line release is accomplished. The release actuator causes the latch to release the line when a first predetermined tension is placed on the line followed by a second, lesser predetermined tension.

In a spring operated version of the release actuator, a plunger is retained by a shear pin. The plunger is subjected to tension from the line. When the first tension level is reached, the shear pin breaks and the plunger moves under tension, compressing a spring. When the tension subsequently decreases, the plunger is urged in the opposite direction by the spring, to operate a release latch which frees the line from the parachute harness.

In a pressurized gas operated version of the release actuator, a piston containing a pressurized gas capsule is retained by a shear pin. The piston is subjected to tension from the line. When the first tension level is reached, the shear pin breaks, allowing the piston to move to pierce the capsule on an anvil or stylus. When the tension on the piston decreases to the second tension level, the gas urges the piston upward to operate a pendant release latch which frees the pendant from the parachute harness.

18 Claims, 5 Drawing Figures

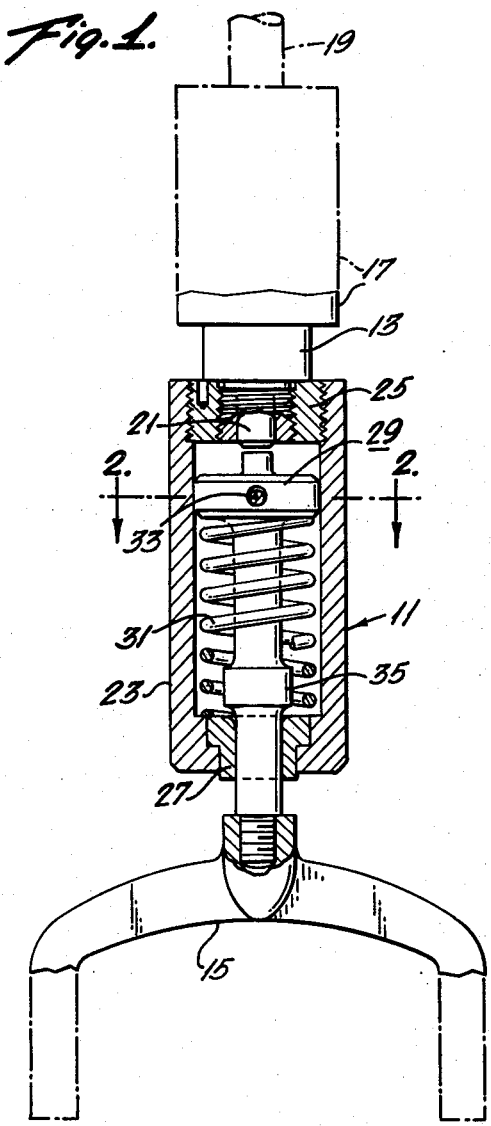
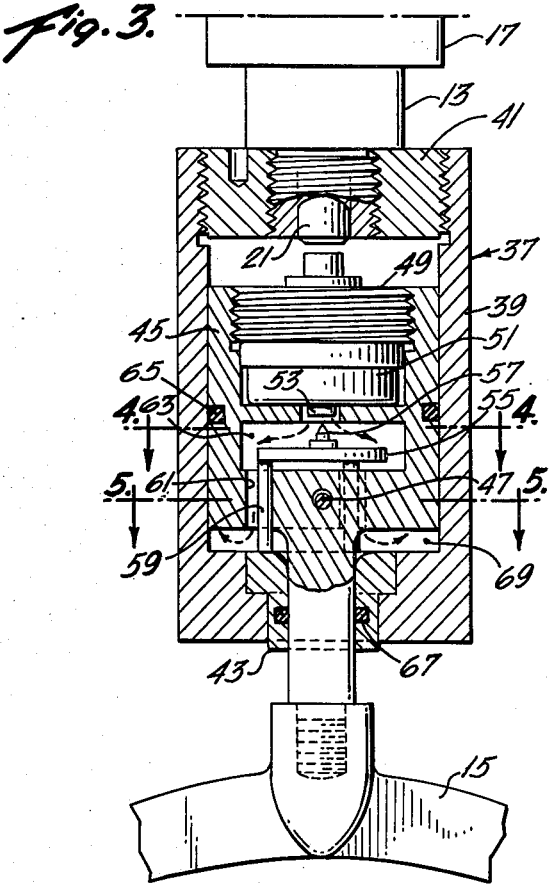
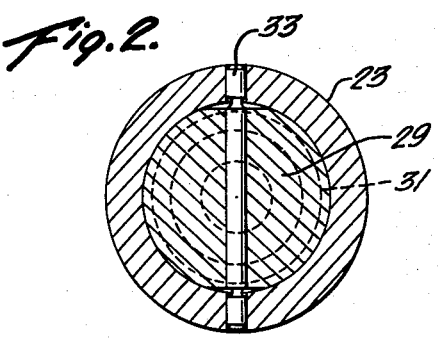
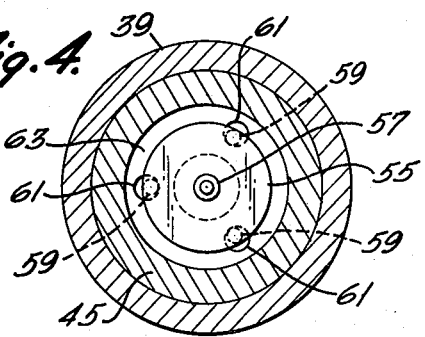
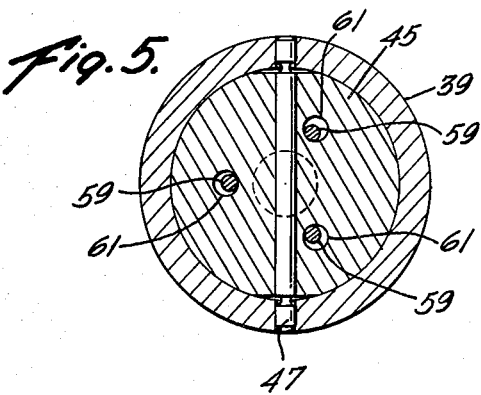

LINE RELEASE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to tension-operated line release systems and in particular to parachute harness load releasing systems.

In an aircraft escape system, the crewman, his body armor, parachute and survival equipment are pulled clear of the aircraft by a rocket which is launched ahead of the crewman by an explosive cartridge powered catapult. The rocket is attached to the crewman's parachute harness by a nylon line pendant, which is subjected to varying tension loads depending on whether, and how long ago, the rocket has been launched, ignited, or burned out. Following launch of the rocket, the pendant line pays out at a very low tension until it reaches full extension, when rocket ignition is triggered. Following ignition, rocket thrust and pendant line tension increases rapidly to a maximum, remains substantially constant thereafter for approximately 90% of burn time, then falls to zero during a trail out period. After the crewman has been pulled clear of the aircraft, he can be carried some distance away from the aircraft and his parachute can be deployed. It is necessary to detach the rocket and pendant line from the crewman shortly before rocket burnout in order to prevent their possible entanglement with the shroud lines or canopy of the opening parachute. It has been the general practice to actuate the pendant release latch used in this system with an explosive cartridge contained in a case attached to the crewman's parachute harness and connected to the pendant line release latch by flexible tubing. The cartridge is fired, via a time delay fuse, by a detonator fired when the crewman leaves the seat. While this device has served the purpose, it has not proven entirely satisfactory because it does not always release the pendant line at the right point in the rocket burn period due to variation in the required time interval with flight conditions, rocket impulse, and launch velocity, and due to variation in fuse time due to manufacturing tolerances. In addition, hardware containing an explosive charge must be carried on the user's harness or vest, thereby adding weight, increasing bulk, and creating an additional hazard to the user by its very nature.

SUMMARY OF THE INVENTION

Accordingly, it is a general purpose of the present invention to provide a line release system which automatically releases a pendant line upon appropriate rocket thrust loss instead of at a fixed time which estimates the time of burnout, so that the pendant line and rocket are detached from the user at the correct point in the rocket burn period.

Other objects of the present invention are to provide a line release system which utilizes line tension to release the line at the proper moment which is independent of a time interval which cannot be accurately determined and which is a simple, self-contained system requiring no auxiliary hardware.

Further objects of the present invention are to provide a line release system which releases a pendant at a time such that the pendant and rocket do not entangle or otherwise interfer with parachute lines, and which is nonexplosive.

Briefly, these and other objects of the invention are accomplished by means of a line release system including a plunger or piston which is fixedly attached to an aircrewman's parachute harness, which is capable of contacting the actuating plunger or piston of a pendant line release, and which is movably disposed within a hollow casing which is fixedly attached to the pendant release and thus to the pendant itself. This piston is initially held in place in the casing by a shear pin which breaks as the pendant line is subjected to a sufficiently large tension by the rocket. In one embodiment of the present invention, a spring is movably disposed within the casing and surrounding the piston. After the shear pin is broken, pendant line tension causes the piston to compress the spring. As pendant line tension drops following rocket burnout, the compressed spring is released to urge the piston upward to contact and depress the actuating piston of the pendant release, effecting release of the pendant line. In an alternative embodiment, after the shear pin is broken, pendant line tension forces a compressed air capsule disposed within the piston downward against a stylus or anvil which punctures the capsule to release the gas beneath the piston. As pendant line tension decreases following rocket burnout, the pressure of the released gas forces the piston upward to contact and depress the actuating piston of the pendant release, so that release of the pendant line from the user is effected.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a preferred embodiment of a line release system according to the present invention shown in a side elevation with a portion shown in a sectional view;

FIG. 2 is a section of the system of FIG. 1 taken along the line 2—2;

FIG. 3 is another preferred embodiment of a line release system according to the present invention shown in a side elevation with a portion shown in a sectional view;

FIG. 4 is a section of the system of FIG. 3 taken along the line 4—4; and

FIG. 5 is a section of the system of FIG. 3 taken along the lines 5—5.

DESCRIPTION OF THE PREFERRED EMBODIMENTS

Referring now to the drawings, wherein like reference characters designate like or corresponding parts throughout the several views, there is shown in FIGS. 1 and 2 a spring powered automatic pendant release actuator 11 connecting the pendant line release latch 13 with a parachute harness fitting adapter 15. Latch 13 engages pendant line terminal 17 which is fixed to pendant line 19, so that the pendant line load is transmitted through actuator 11 to adapter 15. latch 13 can be released by depressing latch release plunger 21 to separate pendant line 19 from latch 13.

Actuator 11 comprises a hollow casing 23 which can be cylindrical, threaded plug 25 and bushing 27.

Threaded plug 25 threadingly engages the upper portion of casing 23, and is configured to threadingly engage the lower, threaded portion of latch 13 containing release plunger 21. A plunger 29 loaded by spring 31 is held in a cocked position by a shear pin 33. The lower end of plunger 29 is configured to threadingly engage adapter 15. Shear pin 33 is configured to break under a load substantially above that typically placed on pendant line 19 shortly after rocket ignition but well below the maximum line tension during rocket burn. For example, the breaking load of shear pin 33 can be 750 pounds where the maximum line tension is 1375 pounds. When a load is applied to pendant line 19, it is carried from casing 23 to plunger 29 by shear pin 33 until the breaking load of the shear pin is reached. Upon shearing of shear pin 33, the load is transferred to the shoulder 35 of plunger 29 and to bushing 27 by further compression of spring 31. Actuator 11 is now armed. Plunger 29 is held in the retracted position by pendant line 19 tension until the tension drops below the spring 31 force. Plunger 29 then moves upward, depressing latch release plunger 21, disengaging latch 13 from terminal 17 thus detaching pendant line 19 and the rocket from the harness and crewman. Spring 31 is configured to effect this release when a desired load level, which is a typical pendant line 19 load during the rocket trail out period and is well below the breaking load of shear pin 33, is reached; this load can for example be 100 pounds tension. Casing 23, plug 25, bushing 27 and plunger 29 can be constructed of metal, such as steel or aluminum, capable of withstanding the tension imposed by the rocket on pendant line 19. Spring 31 can be of music wire which can for example be of 0.124 inch diameter. Shear pin 33 can for example be constructed from 0.1495 inch diameter drill rod having two or more reduced diameter sections.

There is shown in FIGS. 3-5, an alternative pressurized gas powered automatic pendant release actuator 37 installed between pendant line release latch 13 and fitting adapter 15 in the same manner as spring loaded automatic pendant release actuator 11 described above. As with actuator 11, latch 13 as used with actuator 37 engages terminal 17 thus transmitting the pendant line 19 load through actuator 37 to adapter 15. Gas powered actuator 37 comprises a casing 39 which can be cylindrical, a threaded plug 41 configured to threadingly engage the upper portion of casing 39 and the lower portion of latch 13, and bushing 43. A piston and rod unit 45 is held in place within casing 39 by shear pin 47. The lower end of piston and rod unit 45 threadingly engages adapter 15. Unit 45 is held in position in casing 39 by shear pin 47. Piston and rod unit 45 includes a pressurized gas capsule retainer 49 which threadingly engages the top of unit 45 and permits insertion and removal of a pressurized gas capsule 51, such as a $CO_2$ capsule, into and from unit 45. A capsule piercing anvil 55 is movably disposed within unit 45 beneath capsule 51, and has a plurality of legs 59 which extend through holes 61 in the bottom of unit 45 to rest on and be supported by bushing 43 and the bottom of casing 39. Legs 59 and holes 61 are arranged so as not to interfere with shear pin 47. The top of retainer 49 is configured to depress plunger 21 when unit 45 is urged against latch 13. As with actuator 11, when a load is applied to pendant line 19, the load is carried from casing 39 to piston and rod unit 45 by shear pin 47 until the breaking load of the shear pin is reached. Upon shearing of shear pin 47, unit 45 moves into contact with the bottom of casing 39 so that the stylus 57 of anvil 55 punctures soft plug 53 of capsule 51, releasing the pressurized gas contained in the capsule into clear space 63 and through holes 61. Actuator 37 is now armed. Unit 45 is held in contact with the bottom of casing 39 by pendant line 19 tension until the tension drops to the preset release level. Unit 45 is then forced upward by gas pressure as gas from capsule 51 passes through holes 61 in the bottom of unit 45 and into space 69 between unit 45 and the bottom of casing 39. O-rings 65 and 67 prevent leakage of the gas from space 69. As a result, gas pressure forces unit 45 upward against release plunger 21 of latch 13, depressing the plunger. As described above, depression of plunger 21 disengages latch 13 from line terminal 17, freeing pendant line 19 and the rocket from the crewman. The loads under which shear pin 47 will shear and the pressurized gas from capsule 51 will cause pendant line 19 release are chosen using the same criteria as for spring loaded actuator 11. While the release level for actuator 11 is set by the strength of spring 31, the release level for actuator 37 is determined by gas capsule 51. As with actuator 11, the shear pin 47 breaking load and preset release load can for example be 750 pounds and 100 pounds, respectively. Casing 39, plug 41, bearing 43, piston and rod unit 45, and retainer 49 can be constructed of metal, such as steel or aluminum, capable of withstanding the tension imposed by the rocket on pendant line 19. Anvil 55 can be constructed of any appropriate rigid material. Shear pin 47, like shear pin 33, can for example be constructed from 0.1495 inch diameter drill rod having two or more reduced diameter sections.

In summary, operation of the foregoing invention is as follows. When spring loaded actuator 11 is used in the system, as tension is applied to pendant line 19, shear pin 33 transfers this load to plunger 29 until the breaking point of the shear pin is reached. After shear pin 33 breaks, this loading forces plunger 29 to further compress spring 31. When the tension on pendant line 19 is released sufficiently, spring 31 urges plunger 29 to depress release plunger 21 of release latch 13, thereby releasing pendant line 19 from the user. When pressurized gas powered actuator 37 is used in the system, as tension is applied to pendant line 19, shear pin 47 transfers this loading for casing 39 to unti 45 until the breaking point of shear pin 47 is reached. After shear pin 47 breaks, piston and rod unit 45 is moved with respect to casing 39 by line 19 tension, so that pressurized gas capsule 51 is urged against and pierced by stylus 57 of anvil 55. As the tension on pendant line 19 decreases, the pressurized gas released by capsule 51 urges unit 45 in the opposite direction to depress release plunger 21 of release latch 13, thereby freeing pendant line 19 from the user.

It should be understood that the position of the actuator and the latch can be reversed with respect to the line and harness; the plunger or piston and rod unit can be connected to the line instead of to the adapter, and the latch can be linked to the adapter instead of to the line. Also, the shear pin utilized in this invention can be of different materials and configurations other than disclosed above, and the breaking load of the shear pin can vary as required by the loading on the pendant line. For the spring loaded actuator, the material, configuration and strength of the spring used can also vary as required by the pendant line loading. In addition, a liquid spring can be used instead of the coil spring. Also, the gas powered actuator can be used with any size or shape pressurized gas capsule, which may or may not have a soft plug, and the dimensions of various parts of that actuator can be varied accordingly to accommodate various capsules, provided that the capsule used is capable of providing sufficient gas pressure to cause release of the pendant line at the desired loading. In addition, the capsule can be replaced with a refillable pressurized gas chamber permanently installed in the piston and rod unit, having a replaceable thin diaphragm capable of being pierced by an anvil stylus. Furthermore, the anvil can have any number of legs.

Thus there has been provided a novel line release system which automatically releases a pendant line upon appropriate rocket thrust loss or decrease in loading, instead of at a fixed time which only estimates the time of burnout, so that the pendant line and rocket are detached from the user at the correct point in the rocket burn period. This system utilizes line tension to actuate release of the line. Also, the system is nonexplosive and thus constitutes less of a hazard to the user. In addition, the system is a simple, self-contained unit requiring no auxiliary hardware. Furthermore, the system releases the pendant at a time such that the pendant and rocket do not entangle or otherwise interfere with parachute lines.

Obviously, many modifications and variations of the present invention are possible in light of the above teachings. It is therefore to be understood that within the scope of the appended claims the invention may be practiced otherwise than as specifically described.

What is claimed is:

1. A line release system, comprising:
    a line;
    first and second pulling means attached to each end of said line for imposing varying tension loads on said line;
    latching means for releasably connecting said line to either of said pulling means until actuated to release said line therefrom and including a depressible plunger which, when depressed, actuates said latching means to release said line; and
    actuating means located between and fixed to said latching means and to said one of said pulling means for actuating said latching means when said line undergoes a first preset tension load followed by a lesser second preset tension load, and including
    a hollow casing attached at one end to said latching means;
    a rigid member slidably disposed within said casing and extending from the other end of said casing and being secured at one end to said one of said pulling means, the other end of said member being configured to contact said plunger;
    a shear pin rigidly connecting said member to said casing and configured to break under the first preset tension load; and
    resilient means, capable of recovering from compression thereof, disposed within said casing for urging said member, in a direction opposite to that of the tension loads, against said plunger, while said line is under the second preset load.

2. A system as defined in claim 1 wherein said resilient means comprises a spring.

3. A system as defined in claim 1 wherein said resilient means comprises a gas.

4. A system as defined in claim 3, further comprising:
    a pierceable pressurized gas capsule disposed within said member;
    piercing means, slidably disposed within said member adjacent to said capsule and supported by said casing for piercing said capsule when said capsule is pressed upon said piercing means, following the breaking of said pin, by the tension load; and
    conduit means for conducting the gas from within said member to between said member and the lower end of said casing.

5. A line release actuator, adapted to actuate, while under tension loading, a line release latch when a first tension load appears followed thereafter by a second tension load, comprising:
    a hollow casing fixed at one end to the latch;
    a rigid member subject to the tension loading, slidably disposed within said casing, one end of said member being adapted to actuate the latch;
    a shear pin rigidly connecting said member to said casing and configured to break under the first tension load; and
    resilient means, capable of recovering from compression thereof, disposed within said casing for urging said member, in a direction opposite to that of the tension loading, to a position to operate the latch while said member is under the second tension load.

6. An actuator as defined in claim 5, wherein said resilient means comprises a spring.

7. An actuator as defined in claim 5, wherein said resilient means comprises a gas.

8. An actuator as defined in claim 7, further comprising:
    a pierceable pressurized gas capsule disposed within said member;
    piercing means, slidably disposed within said member adjacent to said capsule and supported by said casing, for piercing said capsule when said capsule is pressed upon said piercing means, following the breaking of said pin, by the line tension load imposed on said member; and
    conduit means for conducting the gas from within said member to between said member and the lower end of said casing.

9. A line release system, comprising:
    a line;
    first and second pulling means attached to each end of said line for imposing varying tension loads on said line;
    releasing means for releasably connecting said line to one of said pulling means until actuated to release said line therefrom;
    actuating means operatively connected between said releasing means and said one of said pulling means for actuating said releasing means when the line tension load is below a first predetermined value; and
    arming means rigidly and releasably connecting said releasing means and said actuating means for preventing said actuating means from actuating said releasing means until after the line tension load exceeds a second predetermined value which exceeds the first value.

10. A line release system as defined in claim 9 wherein said actuating means comprises:
    a member movable with respect to said releasing means and connected to said one pulling means; and
    force exerting means operatively connected between said member and said release means for urging said member to actuate said releasing means when the tension load is below the first predetermined value.

11. A line release system as defined in claim 10 wherein said arming means comprises a breakable member connected between said member and said releasing means for preventing movement when the line tension load is below the second predetermined value.

12. A line release system as defined in claim 10 wherein said force exerting means comprises a spring.

13. A line release system as defined in claim 10 wherein said force exerting means comprises a gas.

14. A line release actuator adapted to be connected between a line release and a source of tension loading and adapted to actuate the release while under tension loading, comprising:

actuating means adapted to be operatively connected between the release and the source for actuating the release when the tension loading is below a first predetermined value; and arming means rigidly and releasably adapted to connect the release and said actuating means for preventing said actuating means from actuating the release until after the tension loading exceeds a second predetermined value which exceeds the first value.

15. An actuator as defined in claim 14 wherein said actuating means comprises:

a member adapted to be movable with respect to the release and adapted to be connected to the source; and force exerting means adapted to be operatively connected between said member and the release for urging said member to actuate the release when the tension loading is below the first predetermined value.

16. An actuator as defined in claim 15 wherein said arming means comprises a breakable member connected to said member and adapted to be connected to the release for preventing movement when the tension loading is below the second predetermined value.

17. An actuator as defined in claim 15 wherein said force exerting means comprises a spring.

18. An actuator as defined in claim 15 wherein said force exerting means comprises a gas.

* * * * *

UNITED STATES PATENT AND TRADEMARK OFFICE
CERTIFICATE OF CORRECTION

PATENT NO. : 4,221,417
DATED : September 9, 1980
INVENTOR(S) : John H. Towle

It is certified that error appears in the above—identified patent and that said Letters Patent are hereby corrected as shown below:

On the Title and Abstract (cover) page, after item [76], insert the following item:

-- [73] Assignee: The United States of America as represented by the Secretary of the Navy, Washington, D.C. --

Signed and Sealed this

Twenty-third Day of December 1980

[SEAL]

Attest:

SIDNEY A. DIAMOND

Attesting Officer

Commissioner of Patents and Trademarks